Feb. 14, 1939.  A. GRÖZINGER  2,146,733
STARTING MECHANISM FOR INTERNAL COMBUSTION ENGINES
Filed May 19, 1936
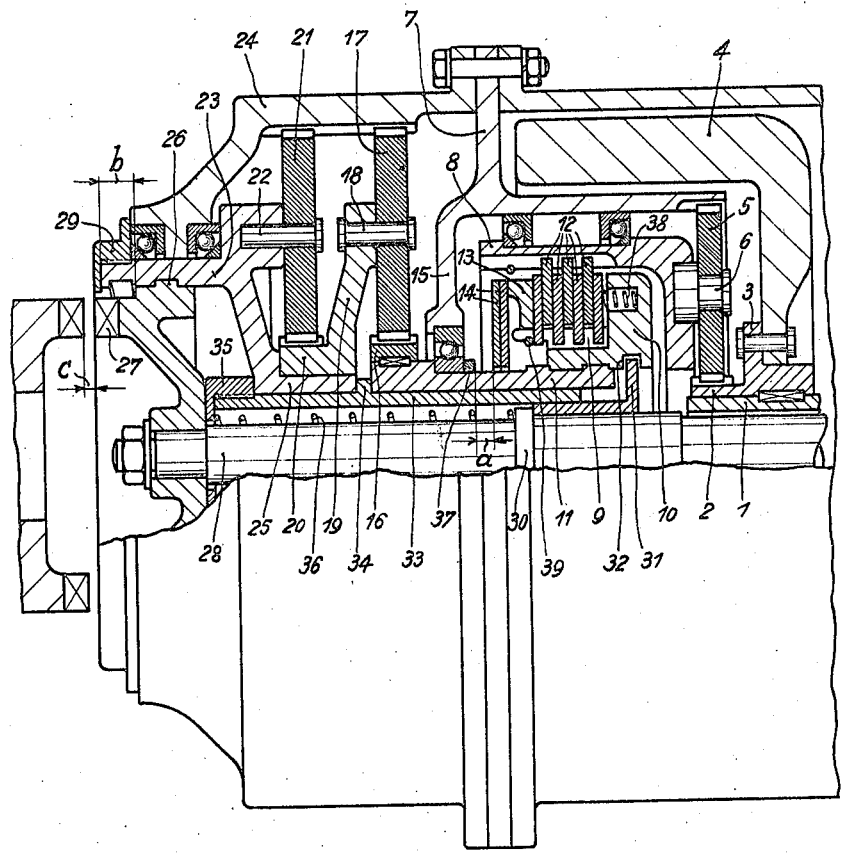
Inventor
Albert Grözinger
by Steward & McKay
his attorneys Patented Feb. 14, 1939

2,146,733

UNITED STATES PATENT OFFICE 2,146,733

STARTING MECHANISM FOR INTERNAL COMBUSTION ENGINES

Albert Grözinger, Stuttgart-Bad Cannstatt, Germany, assignor to Robert Bosch Gesellschaft mit beschränkter Haftung, Stuttgart, Germany Application May 19, 1936, Serial No. 80,596
In Germany May 20, 1935

10 Claims. (Cl. 123—179)

The presence invention relates to starting gears, in particular flywheel starters for internal combustion engines, of the type wherein a driving member can be caused to engage by hand in one part of the machine which is coupled with the starting driving shaft through an automatically-acting friction disc coupling by means of an axially displaceable pressure member. It is the object of the invention in such apparatus to avoid the friction coupling becoming operative before the driving member is fully engaged. For the solution of this problem it has already been proposed to lift off the pressure member from the friction discs on engagement of the driving member. This makes a special engaging bar with different steps necessary. Another proposal is to keep off the pressure member from the friction discs by springs, or to separate the friction discs from one another by expanding springs, and then to take off the action of these springs by means of a stop moving with the driving member, and thereby to make the coupling ready to drive. This solution necessitates an accurate determination of the spring forces so that the moment often already exerted by the lamellae in the loosened position of the coupling shall not exceed the spring pressure which holds off the pressure member from the friction discs. Also there is already known a starting gear in which an engageable driving member is connected to the starter shaft through an automatically-acting friction disc coupling by means of an axially displaceable pressure member which is first switched on by an electromagnet after the engagement of the driving member, and then becomes completely active.

These faults and difficulties are avoided according to the invention by a part being provided rigidly preventing the movement of the longitudinally screwable pressure member in dependence upon the engagement motion of the driving member which alters the pressure motion in the same sense as the engagement motion of the pressure member.

The accompanying drawing shows one form of the invention in cross-section, wherein I is the hollow armature shaft of an electric motor which is not further shown. On this shaft is a gear wheel 2 with a flange 3 to which a flywheel 4 is connected. Planet wheels 5 engage with the gear wheel 3 and are carried by pins 6, which sit in a cup-shaped casing 8 rotatable in a frame 7, which casing forms the outer part of a friction disc coupling. A coupling nut 10 forms the inner part of the coupling, which nut is adapted for screw-threaded relationship with a screw sleeve 11. Between the casing 8 and the nut 10 are arranged friction discs 12 in the usual manner. 13 is a pressure plate which is supported by resilient discs 14, which in turn bear against an abutment 37. In a recess in the nut 10 is housed a helical spring 38 which presses the friction discs with a slight pressure against a spring ring 39 on the nut.

The screw sleeve 11 is rotatably positioned in an inwardly projecting flange 15 of the frame 7, whilst on that end of the sleeve projecting beyond the coupling nut through the flange 15 is a gear wheel 16, with which a planet wheel 17 is in engagement, which planet wheel 17 is mounted on a pin 18, attached to a flange piece 19, the hub 20 of which is formed as a toothed wheel. The gear wheel 20 is engaged by a gear wheel 21, mounted on a pin 22, attached to a cup 23, which is rotatable in the casing 24 of the starter. The cup 23, further, has a boss 25 on which the flange piece 19 is rotatably mounted.

On the inner face of the cup 23 is provided a relatively quick thread, whilst in the cup 23 a driving member in the form of a dog clutch 27 is arranged which clutch outwardly has an external thread of quick pitch adapted for engagement with the thread 26 of the cup. The clutch 27 is connected to a rod 28 which lies within the shaft of the starter, and can be longitudinally displaced by the hollow armature shaft 1, and by a device not shown, in order to bring the clutch into engagement with a counter clutch arranged on the crankshaft of an engine. The engagement of this clutch is limited by a cap nut 29 which is screwed on to the cup 23.

The rod 28 has a collar 30 which serves as stop for a sleeve member or ring disc 31 the edge of which engages in a groove 32 of the coupling nut 10. The rod 28 further is surrounded by a sleeve 33 on which are rotatably mounted the screw sleeve 11 and the boss 25 of the cup 23, and which, through a collar 34 lying between these elements, is secured against longitudinal movement. On the outer end of this sleeve is screwed a cap nut 35, between which and the collar 30 of the rod 28 is arranged a spring 36. In the position of rest of the starter the coupling nut 10 and the abutment 37 are so widely spaced apart that they must traverse the distance $a$ in order to be able to press together the friction discs, the pressure plate 13 and the resilient discs 14. This distance $a$ is by a small amount shorter than the distance $b$ through which the clutch must be moved to come into contact with the rotary cap nut 29.

The starting apparatus works as follows. For starting the machine the flywheel 4 is first brought to a high speed of rotation whereupon the cup-shaped casing 8 rotates together with the flywheel. The coupling nut 10 is so pressed by the small spring 38 that it is able to transmit a rotary impulse which just suffices to rotate the sleeve 11, the planet wheels 16, 17 and 20, 21 and the casing 23 with the clutch 27. A screwing forward of the clutch by means of the quick thread 26 is prevented by the spring 36, which attempts to draw back the clutch. After the high speed of rotation of the flywheel has been reached, the operator engages the clutch 27 through the axial displacement of the bar 28, which axial displacement may be effected by any suitable means, not shown. Prior to any engagement of the clutch, the nut 10 is prevented from displacement forward on the sleeve 11, by the disc 31 and the collar 30, on which the disc 31 lies, and accordingly the coupling cannot be fully engaged. On engagement of the clutch however, the collar 30 is displaced, thereby giving freedom for the disc 31 and the nut 10 to move. When the nut has traversed the space $a$ it begins to press together the friction discs. The space $c$ between the clutch 27 and the counterclutch is considerably smaller than the distance $a$ so that the clutch is already in action, before the coupling becomes completely operative. The space $b$ between the clutch 27 and the stop 29 is greater than the distance $a$ of the coupling nut 10. As a result the collar 30 may move over a greater distance than the disc 31 or the nut 10, and accordingly is not limited in its motion when pressing together the friction discs. The quick thread between the clutch 27 and casing 23 causes a secure and complete engagement of the clutch.

I declare that what I claim is:

1. Starting mechanism for internal combustion engines comprising a driving member axially displaceable at will, a driving shaft, a friction disc clutch normally in limited engagement, means connecting said clutch to said driving shaft, an automatically screwable pressure member, means rotatable relative to said driving member and said driving shaft, means connecting said rotatable means and said driving member, said rotatable means mounting said pressure member for longitudinal movement thereon and rotary movement therewith, said pressure member connecting said friction disc clutch and said rotatable means and operable to render said friction disc clutch fully operative, and an element controlled by and dependent upon the position of the driving member and which prior to engagement of the driving member with a part of the engine to be started, retains the screwable pressure member in a position permitting limited engagement only of the friction disc clutch, but which, on engagement of the driving member with the part of the engine to be started, is displaced to permit of displacement in the same direction of the screwable pressure member to render the friction disc clutch fully operative only after full engagement of the driving member with a part of the engine to be started.

2. Starting mechanism for internal combustion engines comprising a driving member axially displaceable at will, a driving shaft, a friction disc clutch normally in limited engagement, means connecting said clutch to said driving shaft, an automatically screwable pressure member, a fly wheel on said driving shaft for rotating said friction disc clutch, means rotatable relative to said driving member and said driving shaft, means connecting said rotatable means and said driving member, said rotatable means mounting said pressure member for longitudinal movement thereon and rotary movement therewith, said pressure member connecting said friction disc clutch and said rotatable means and operating said clutch, and an element controlled by and dependent upon the position of the driving member and which prior to engagement of the driving member with a part of the engine to be started, retains the screwable pressure member in a position permitting limited engagement only of the friction disc clutch, but which, on engagement of the driving member with the part of the engine to be started, is displaced to permit of displacement in the same direction of the screwable pressure member to render the friction disc clutch fully operative only after full engagement of the driving member with a part of the engine to be started.

3. Starting mechanism for internal combustion engines comprising a driving member axially displaceable at will, a driving shaft, a friction disc clutch, means connecting said clutch to said driving shaft, an automatically screwable pressure member for operating said clutch, a fly wheel on said driving shaft for rotating said friction disc clutch, rotatable means mounting said pressure member for longitudinal movement thereon and rotary movement therewith, means connecting said rotatable means and said driving member, said pressure member connecting said friction disc clutch and said rotatable means, a rod connected to and extending axially of said driving member towards said pressure member and said clutch and a projection on said rod within the path of displacement of said pressure member to prevent displacement of said pressure member to render said friction disc clutch fully operative until after said driving member has been displaced to engage with the part of the engine to be started.

4. Starting mechanism for internal combustion engines comprising a driving member axially displaceable at will, a driving shaft, a friction disc clutch, means connecting said clutch to said driving shaft, an automatically screwable pressure member for operating said clutch, rotatable means mounting said pressure member for longitudinal movement thereon and rotary movement therewith, means connecting said rotatable means and said driving member, said pressure member connecting said friction disc clutch and said rotatable means, said pressure member being arranged on the side of the friction discs opposite to the driving member, a rod connected to and extending axially of said driving member towards said pressure member and said clutch, a projection on said rod and a sleeve member engaging said projection and said pressure member to prevent displacement of said pressure member to render said friction disc clutch fully operative until after said driving member has been displaced to engage with the part of the engine to be started.

5. Starting mechanism for internal combustion engines comprising a driving member axially displaceable at will to engage a part of the engine to be started, a driving shaft, a friction clutch, means connecting said clutch to said driving shaft, an automatically screwable pressure member operating said clutch, rotatable means mounting said pressure member for longitudinal movement thereon and rotary movement therewith, means connecting said rotatable means and said driving member, said pressure member connecting said friction clutch and said rotatable means and operable to render said clutch fully operative, an element controlled by and dependent upon the position of the driving member and which prior to engagement of the driving member with a part of the engine to be started retains said pressure member in a position permitting limited engagement only of said friction clutch, but which, on engagement of the driving member with the engine, is displaced to permit displacement of said pressure member to render the friction clutch fully operative only after full engagement of the driving member with a part of the engine to be started, and means for displacing said driving member and for permitting displacement of said element.

6. Starting mechanism for internal combustion engines comprising a driving member axially displaceable at will, a driving shaft, a friction disc clutch, means connecting said clutch to said driving shaft, a threaded sleeve rotatable relative to said driving member and said driving shaft, a pressure member screwable on said sleeve for actuating said friction disc clutch to render it fully operative and for connecting said sleeve and said clutch, means connecting said sleeve and said driving member, and a control member for said pressure member displaceable in dependence upon the displacement of the driving member and which allows full engagement of the friction disc clutch only after engagement of the driving member with a part of the engine.

7. Starting mechanism for internal combustion engines comprising a driven member engageable with a part of the engine to be started, a driving member, a rotatable shaft rotatable relative to said driven and driving members, a control member mounted on said rotatable shaft for longitudinal movement thereof and rotary movement therewith, friction clutch means between said control member and said driving member, transmission means between said rotatable shaft and said driven member, said control member being axially displaceable on said rotatable shaft to render said clutch means fully operative only after engagement of the driven member with a part of the engine to be started, means for moving said member into engagement with a part of the engine to be started, and means carried by said last-mentioned means and engaging said pressure member and preventing displacement thereof to render said clutch means fully operative until after engagement of the driven member with a part of the engine to be started.

8. Starting mechanism for internal combustion engines comprising a driven member engageable with a part of the engine to be started, a driving member, a rotatable shaft rotatable relative to said driven and driving members, a control member mounted on said rotatable shaft for longitudinal movement thereof and rotary movement therewith, friction clutch means between said control member and said driving member, transmission means between said rotatable shaft and said driven member, said control member being axially displaceable on said rotatable shaft to render said clutch means fully operative only after engagement of the driven member with a part of the engine to be started, a rod connected to said driven member for moving it into engagement with a part of the engine to be started, and means carried by said rod and engaging said pressure member and preventing displacement thereof to render said clutch means fully operative until after engagement of the driven member with a part of the engine to be started.

9. Starting mechanism for internal combustion engines comprising a driven member engageable with a part of the engine to be started, a driving member, a threaded sleeve rotatable relative to said driven and driving members, a control member mounted on said sleeve for longitudinal movement thereon and rotary movement therewith, friction clutch means between said control member and said driving member, transmission means between said sleeve and said driven member, said control member being axially displaceable on said sleeve to render said clutch means fully operative only after engagement of the driven member with a part of the engine to be started, a member extending through said sleeve for moving said driven member into engagement with a part of the engine to be started, and means carried by said last-mentioned member and engaging said pressure member and preventing displacement thereof to render said clutch means fully operative until after engagement of the driven member with a part of the engine to be started.

10. Starting mechanism for internal combustion engines comprising a driven member engageable with a part of the engine to be started, a driving member, a threaded sleeve rotatable relative to said driven and driving members, a control member mounted on said sleeve for longitudinal movement thereon and rotary movement therewith, friction clutch means between said control member and said driving member, transmission means between said sleeve and said driven member, said control member being axially displaceable on said sleeve to render said clutch means fully operative only after engagement of the driven member with a part of the engine to be started, a rod extending through said sleeve and connected to said driven member for moving it into engagement with a part of the engine to be started, a projection on said rod, and a sleeve member engaging said projection and said pressure member and preventing displacement of said pressure member to render said clutch means fully operative until after said driving member has been displaced to engage with the part of the engine to be started.

ALBERT GRÖZINGER.